(12) United States Patent
Dupey et al.

(10) Patent No.: US 11,151,100 B2
(45) Date of Patent: Oct. 19, 2021

(54) PERFORMING DATA QUALITY FUNCTIONS USING ANNOTATIONS

(71) Applicant: SAP SE, Walldorf (DE)

(72) Inventors: Ronald Dupey, Onalaska, WI (US);
Ryan Champlin, La Crosse, WI (US)

(73) Assignee: SAP SE, Walldorf (DE)

(*) Notice: Subject to any disclaimer, the term of this patent is extended or adjusted under 35 U.S.C. 154(b) by 557 days.

(21) Appl. No.: 15/295,557

(22) Filed: Oct. 17, 2016

(65) Prior Publication Data

US 2018/0107694 A1    Apr. 19, 2018

(51) Int. Cl.
*G06F 16/215*    (2019.01)
*G06F 16/23*    (2019.01)

(52) U.S. Cl.
CPC ........ *G06F 16/215* (2019.01); *G06F 16/2365* (2019.01)

(58) Field of Classification Search
CPC .......................... G06F 16/215; G06F 16/2365
See application file for complete search history.

(56) References Cited

U.S. PATENT DOCUMENTS

| | | | |
|---|---|---|---|
| 2005/0125716 A1* | 6/2005 | Cragun | G06F 17/241 715/222 |
| 2006/0238919 A1* | 10/2006 | Bradley | G06F 16/215 360/128 |
| 2006/0247944 A1* | 11/2006 | Calusinski, Jr. | G06Q 40/00 705/1.1 |
| 2012/0259877 A1* | 10/2012 | Raghunathan | G06F 21/6254 707/757 |
| 2013/0006992 A1* | 1/2013 | Dani | G06F 3/0482 707/737 |
| 2015/0193511 A1* | 7/2015 | Woody | G06F 16/248 707/722 |
| 2016/0070733 A1* | 3/2016 | Gould | G06F 16/215 707/700 |

* cited by examiner

*Primary Examiner* — Vaishali Shah
(74) *Attorney, Agent, or Firm* — Mintz Levin Cohn Ferris Glovsky and Popeo, P.C.

(57) ABSTRACT

A computer-implemented method for performing a data quality function includes receiving, at a data quality function process, at least one record from a source, where the record includes data, semantic annotations and data quality annotations associated with the data in the record. The semantic annotations are attributes that define the data including input format and output format and the data quality annotations are attributes that define data quality rules to be applied to the data. The data quality function process automatically maps the semantic annotations to data quality input fields and to data quality output fields. The data quality function process applies the data quality rules to the data using the data quality annotations to perform a data quality function. The data quality function process performs the data quality function on the data and outputs the data to a destination in a format defined by the data quality output fields.

16 Claims, 3 Drawing Sheets

PERFORMING DATA QUALITY FUNCTIONS USING ANNOTATIONS

TECHNICAL FIELD

This description relates to performing data quality functions using annotations, including semantic annotations and data quality annotations.

BACKGROUND

Data quality functions may be performed using an on-premise solution and/or a cloud-based solution. Current systems and processes for performing data quality functions may be cumbersome for users to use due to the need to define and store a configuration for each data quality scenario. Users of a cloud-based service will have multiple applications on various systems and devices calling and interfacing with the cloud-based service, and each has data in different schemas, verticals, and countries/locales. Each also has different data quality rules for functions such as data cleansing and data validation. As a result, the traditional set of configurations used in on-premise solutions does not fit well for a cloud-based solution, where each configuration contains input mapping, output selection, and data quality rules.

SUMMARY

According to one general aspect, a computer-implemented method for performing a data quality function includes receiving, at a data quality function process, at least one record from a source, where the record includes data, semantic annotations and data quality annotations associated with the data in the record. The semantic annotations are attributes that define the data including input format and output format and the data quality annotations are attributes that define data quality rules to be applied to the data. The method includes automatically mapping, by the data quality function process, the semantic annotations to data quality input fields and to data quality output fields and applying, by the data quality function process, the data quality rules to the data using the data quality annotations to perform a data quality function. The data quality function process performs the data quality function on the data and outputs the data to a destination in a format defined by the data quality output fields.

In another general aspect, a system for performing a data quality function includes at least one memory including instructions on a computing device and at least one processor on the computing device, where the processor is operably coupled to the at least one memory and is arranged and configured to execute the instructions that, when executed, cause the processor to implement a data quality function, an input mapping module, a data quality engine and an output mapping module. The data quality function is configured to receive at least one record from a source, where the record includes data, semantic annotations and data quality annotations associated with the data in the record. The semantic annotations are attributes that define the data including input format and output format and the data quality annotations are attributes that define data quality rules to be applied to the data. The input mapping module is configured to automatically map the semantic annotations to data quality input fields. The data quality engine is capable of applying the data quality rules to the data using the data quality annotations to perform a data quality function and performing the data quality function on the data. The output mapping module is configured to automatically map the semantic annotations to data quality output fields and to output the data to a destination in a format defined by the data quality output fields.

In another general aspect, a computer program product for performing a data quality function is tangibly embodied on a non-transitory computer-readable storage medium and includes instructions that, when executed, are configured to cause at least one computing device to receive, at a data quality function process, at least one record from a source, where the record includes data, semantic annotations and data quality annotations associated with the data in the record. The semantic annotations are attributes that define the data including input format and output format and the data quality annotations are attributes that define data quality rules to be applied to the data. The data quality function process automatically maps the semantic annotations to data quality input fields and to data quality output fields. The data quality function process applies the data quality rules to the data using the data quality annotations to perform a data quality function. The data quality function process performs the data quality function on the data and outputs the data to a destination in a format defined by the data quality output fields.

The details of one or more implementations are set forth in the accompanying drawings and the description below. Other features will be apparent from the description and drawings, and from the claims.

DETAILED DESCRIPTION

Figure 1:
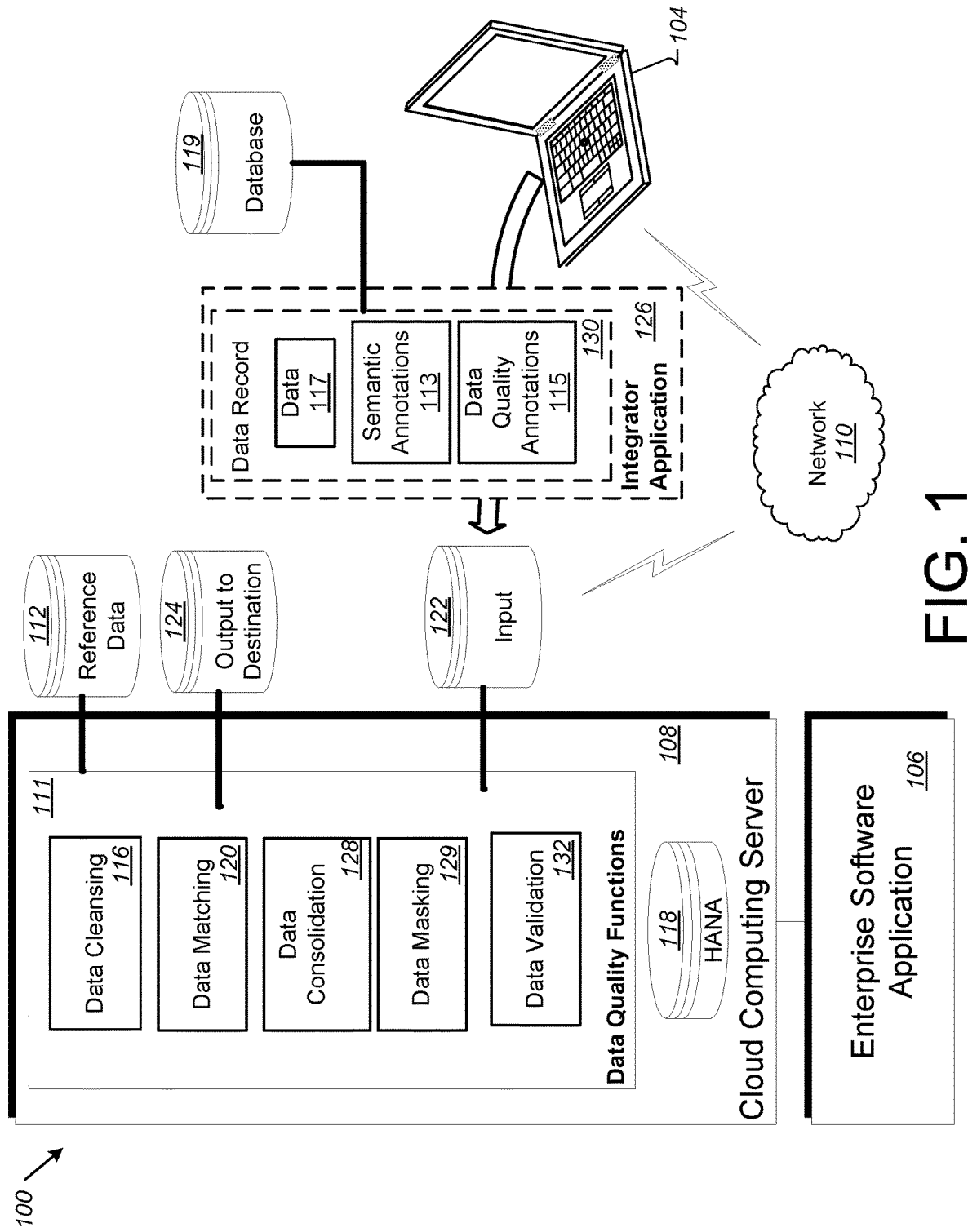
FIG. 1 is a block diagram of an example system for performing data quality functions using annotations in a cloud computing environment.

This document describes systems and techniques for performing data quality functions using annotations, including semantic annotations and data quality annotations. The data quality functions may be implemented as part of a cloud-based solution. When a source sends a record or records containing data to a cloud-based data quality function, the record includes the data along with both semantic annotations and data quality annotations. The semantic annotations are attributes of the data that define that data including an input format for the data and an output format for the data. The data quality annotations are attributes of the data that define data quality rules to be applied to the data. Both the semantic annotations and the data quality annotations are provided by the source along with the data as part of the record or records being sent to the data quality service.

The data quality service, which may be a cloud-based service, receives the record from the source at one of the multiple data quality functions that may be provided by the data quality service. As discussed in more detail below, the data quality service may include data quality functions such as, for example, data cleansing, data matching, data consolidation, data masking, data validation, combinations of one or more of these data quality functions and other data quality functions. The data quality function processes the received record and uses the included semantic annotations and data quality annotations to perform the data quality function on the data in the record. For example, the data quality function automatically maps the semantic annotations to data quality input fields and to data quality output fields. The data quality function applies data quality rules to the data using the data quality annotations. The data quality function is performed on the data and then the data is output to a destination in a format defined by the data quality output field. In this manner, the technical problems currently faced are overcome with this technical solution.

With this technical solution, there is no longer a need to define and store a configuration for each data quality scenario. The semantic annotations replace the need for input mapping and output selection, and the data quality annotations replace the need for rule configuration. The use of both semantic annotations and data quality annotations to drive data quality offer specific new functionality that a general configuration cannot practically offer. Also, the use of both semantic annotations and data quality annotations provides ease-of-use for developers of the applications that consume the data quality cloud service because they are not required to define and store a configuration for field mapping and data quality rules, and they don't have to learn all the nuances of defining these configurations. Instead, the developers provide a semantic annotation on each field sent to the service and each field they want returned from the service. The developers also add data quality annotations on the same data fields that define how they want the data quality function performed. For example, the data quality annotations define how the data may be cleansed as part of a data cleansing or how the data should be validated as part of the data validation. While many of the examples provided in this document relate to data cleansing, including the data quality annotations, the use of the annotations is not limited to data cleansing but may be applied to all other data quality functions.

The use of both semantic annotations and data quality annotations provide one or more of the following advantages. The semantic annotations and data quality annotations replace the need to define and store multiple configurations. The data quality rules are defined on the data attributes that they apply to, instead of in a separate configuration. Providing the ability to define semantic annotations for an attribute allows the consumer to construct the content of a custom attribute, instead of being limited to a fixed list of available generated attributes. Since the semantic annotations and data quality annotations may be in a hierarchical arrangement, the hierarchical annotation definition allows the consumer to define data quality rules for individual data attributes, instead of global rules for a data entity.

The technical solution of using annotations to drive data quality functionality provides other advantages as well. For instance, in order to obtain optimal results in current data quality technologies, an integrator must learn the system of field mapping in the technology. However, it makes sense for an integrator to declare what data resides in each attribute in their data model, or what data they want to reside in each attribute. Providing a means for the integrator to declare semantic annotations, and eliminating the need to do the field mapping themselves, makes the technology much easier to use, and presumably increases quality of results due to prevention of user error.

In current data quality technologies, the data quality rules exist in a configuration that is separate from the data. However, it makes sense for an integrator to declare rules as properties of attributes right at the point of defining an attribute.

Current data quality technologies offer a fixed list of output attributes to select from. There will always be the need for users to want uncommon combinations of attributes, and in the model of a fixed list, the users will have to request the data quality vendor to add additional fields to the list, and wait until a subsequent release where the new attribute is included. With this solution described in this document, the user can simply declare which components they want in an attribute, and the data quality service can generate the attribute with the custom combination of components. There is no need to continually add more attributes to a fixed list.

Current data quality technologies offer a fixed list of business rule options. However, there is a practical limit to the number of options that the current technology exposes to the user. The current technology does not offer the ability to apply every formatting option such as casing, diacritic, language, abbreviation, and so forth to each granular data component. To do so would result in thousands of options in the list, making the current technology unusable for practical purposes. However, applying data quality annotations to the requested attributes eliminates the large list of rule options. The user applies desired data quality rules, as needed, to just the attributes that need customization. This offers the full robust flexibility of offering all options to all data components, but without the overwhelming complexity of displaying thousands of options.

Consuming applications can design user interfaces that have a friendly user experience. Options can be displayed graphically to users and analysts in a way that is intuitive, based on the data that they are seeing and acting on. The user's response can then be converted into data quality annotations that are applied to attributes defined with semantic annotations. These and other advantages may be realized by the technical solution described in this document.

FIG. 1 is an example block diagram of a system 100 for performing data quality functions using annotations in a cloud computing environment. The system includes a source 104 interacting with a cloud computing server 108 through the network 110. The source 104 may be one or more computing devices (e.g., client computing devices) providing any number of user interfaces associated with software executing at the client device. The source 104 may be any type of one or more computing devices including, but not limited to, a laptop, a desktop, a server (e.g., a web server and/or an application server), a smartphone, a tablet, or any combinations thereof.

The source 104 includes an integrator application 126, which is a consuming software application that enables the source 104 to add semantic annotations 113 and data quality annotations 115 to data 117 as part of a data record 130 that is stored in a database 119. As discussed above and in more detail below, the semantic annotations 113 and data quality annotations 115 provide annotations to the data 117, which may be sent as part of one or more data records 130 over network 110 as input 122 to the cloud computing server 108, which hosts and performs one or more data quality functions 111 on the received data records 130.

The source 104 may represent a web server that receives data input from other computing devices. For example, the source 104 as a web server or application server may receive input from another computing device as a user enters data into a form on a website. The data input into the source 104 may then be communicated by the source 104 as part of a data record 130 to the cloud computing server 108, where the cloud computing server 108 can perform one or more of the data quality functions 111 on the received data 117 using the accompanying semantic annotations 113 and data quality annotations 115. While this example describes sending a single data record 130 from the source 104 to the cloud computing server 108, the source 104 may send multiple data records as part of a batch process to the cloud computing server 108 for performing one or more data quality functions 111 on the received group data records.

The cloud computing server 108 (or simply server 108) hosts the data quality functions 111. In some implementations, the server 108 may represent a web server such as a Hana Cloud Platform (HCP) from SAP SE and include a HANA database 118. The HANA database 118 may provide a platform for the data quality functions 111 in cooperation with enterprise software application 106.

The data quality functions 111 include data cleansing 116, data matching 120, data consolidation 128, data masking 129 and data validation 132. One or more of these data quality functions may be performed on the data records 130 received from the source 104, whether received as a single data record or multiple data records. In particular, the data quality functions 111 may be configured to analyze, cleanse, and match customer, supplier, product, or material data (structured or unstructured) to ensure accurate and complete information is provided. In particular, the data quality functions 111 can correct components of name and address data and/or fields and attributes associated with such data. In addition, the data quality functions 111 can validate name and address data based on reference data sources, such as reference data 112, and can also format name and address data according to which country or countries correspond to the name or address data. The data quality functions 111 can provide the advantage of avoiding duplicate entities and can also help in searching and improving existing data in source 104 and the database 119 for the source 104. The reference data 112 may include known reference information from sources such as, for example, various postal offices from various countries around the world.

The data quality functions 111 includes data cleansing 116. Data cleansing 116 can receive an input (e.g., name or address data) and can match either or both using any number of matching engines available. For example, the data cleansing 116 may access reference data 112 to verify proper formatting, field entries, and/or attributes. The data cleansing 116 uses the data quality annotations that are part of the data record to know how address lines should be cleansed, normalized, and/or corrected. Any number of errors can be corrected including but not limited to typographical errors, grammatical errors, country-specific errors, and formatting errors for any of the entered address or name data.

The cloud computing server 108 also includes (or has access to) enterprise software application 106. The enterprise software application 106 represents computer software used to satisfy the needs of a business organization. Enterprise software application 106 generally includes a collection of computer programs (i.e., software applications and repositories) with common business applications, tools for modeling how an organization functions, and development tools for building applications unique to the organization. The enterprise software application 106 can be used in combination with server 108 to improve enterprise productivity and efficiency by providing data quality configuration generation and usage.

Services provided by the enterprise software application 106 may include business-oriented tools such as data model configuration management and data quality cleansing and management. Other services are possible including, but not limited to online shopping and online payment processing, interactive product management, automated billing systems, security, enterprise content management, IT service management, customer relationship management, enterprise resource planning, business intelligence, project management, collaboration, human resource management, manufacturing, enterprise application integration, and enterprise forms automation.

The server 108 in system 100 can be communicatively coupled to source 104. Source 104 can access server 108 and any associated software applications. Source 104 can be connected (wired or wirelessly) to system 108, which can provide business data, user interfaces, and other data for use and display. In some implementations, the source 104 can execute one or more applications on the server 108 as a web application, for example.

At least some of the communications between the client 104 and servers 106 or 108 may be performed across or via network 110 (e.g., the Internet). In some implementations, system 100 may represent an example configuration of a system for establishing networks using networked applications built on a shared platform in a cloud computing environment. The source 104 and/or the server 108 may be configured with development technology and hosted and managed services and applications built on top of an underlying platform technology. In one non-limiting example, the term "platform technology" is understood as types of Java development platform, such as e.g., Enterprise JavaBeans® (EJB), J2EE Connector Architecture (JCA), Java Messaging Service (JMS), Java Naming and Directory Interface (JNDI), and Java Database Connectivity (JDBC). In an implementation of the present disclosure described herein, the term "platform technology" is understood as an Enterprise Resource Planning (ERP) technology or in-memory database such as High Performance Analytic Appliance (HANA) platform.

In some implementations, any number of content servers and one or more computer-readable storage devices can communicate with the source 104 and server 108 using network 110 to provide data content to client devices associated with system 100. In some implementations, the network 110 can be a public communications network (e.g., the Internet, cellular data network, dialup modems over a telephone network) or a private communications network (e.g., private LAN, leased lines). In some implementations, the source 104 and/or server 108 can communicate with the network 110 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

The integrator application 126 may provide the software tools and a user interface for display to enable a user to add semantic annotations 113 and data quality annotations 115 to the data 117.

Annotations are characteristics about data applied to the data. Semantic annotations 113 is provide information on what kind of data a particular data attribute contains. For example, semantic annotations applied to a customer data table identifies which attribute contains the customer name, which group of attributes contain the customer location, which attribute or group of attributes contain the contact phone number, and so on. The attribute names in a customer data table may be ambiguous, because the semantic annotation applied to each attribute provides the meaning of the data in the attribute. While semantic annotations can be applied to any data domain, and without limiting the scope of their application, this document uses examples of semantic annotations on the party data domain, such as customer data, vendor data, and employee data. The semantic annotation includes a hierarchy with multiple levels of granularity. The same methodology may be applied to other data domains by using the structure of the domain taxonomy. The semantic annotation definition controls two of the three steps in the data quality configuration: input mapping and selection of output attributes.

Figure 2:
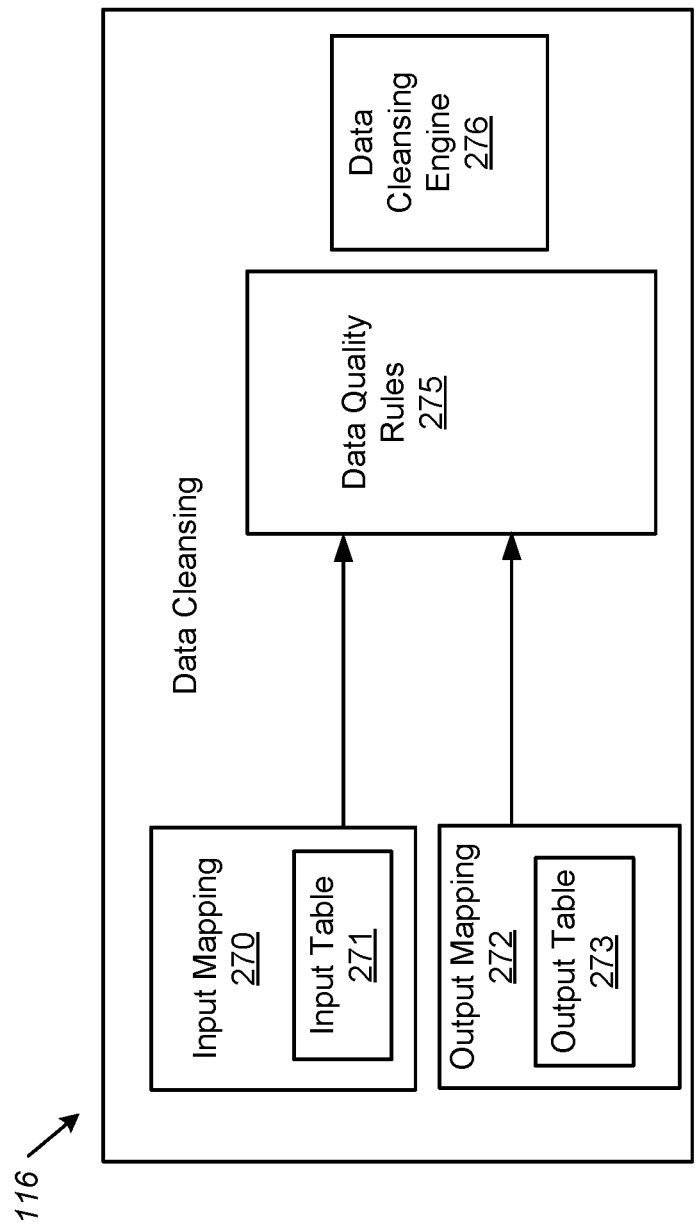
FIG. 2 is an example block diagram of the data cleansing function from FIG. 1.

Referring to FIG. 2, an example block diagram of the data cleansing function 116 from FIG. 1 is illustrated. In this example, the data cleansing 116 includes an input mapping 270 having an input table 271 and an output mapping 272 having an output table 273. The input mapping 270 automatically maps the semantic annotations received as part of the data record to data quality input fields using the input table 271. The input table 271 provides a look up for the input mapping 270 to map the semantic annotations to the data quality input fields. This enable the input data to be mapped to attributes that are meaningful to the data quality operation. In data cleanse operations, the inputting mapping 270 maps the entities being cleansed, such as address fields, organization fields, and birthdate fields.

Consider the following part of an order entry form, as shown in Table 1, where an online shopper is completing the shipping address portion of the checkout process.

TABLE 1

| Shipping address | |
| --- | --- |
| House Number: | 2910 |
| Street: | SPRING ROAD |
| Unit: | APARTMENT 320 |
| City: | CHICAGO |
| Region: | ILLINOIS |
| Postcode: | 60615 |
| Country: | UNITED STATES |

The source 104 sends the data record 130 having the semantic annotation 113 to the data cleansing 116 along with the data 117, as shown in the code snippet below.

```
"cleanseInput": {
    "shipHouseNum": "2910"
        @<Semantics.address.delivery.deliveryAddress.primary.houseNumber,
    "shipStreet": "SPRING ROAD"      @<Semantics.address.delivery.deliveryAddress.primary.street,
    "shipUnit": "APARTMENT 320"      @<Semantics.address.delivery.deliveryAddress.secondary,
    "shipCity": "CHICAGO"            @<Semantics.address.cityRegionPostcode.city,
    "shipState": "ILLINOIS"          @<Semantics.address.cityRegionPostcode.region,
    "shipZip": "60615"               @<Semantics.address.cityRegionPostcode.postcode,
    "shipCountry": "UNITED STATES"   @<Semantics.country
}
```

The data cleansing engine 276 applies the data quality rules 275 to the data using the data quality annotations and then performs the data cleansing operation. The data quality annotations provide the select settings according to data quality rules. The data quality annotations provide the options and preferences that control standardization and formatting of data.

The output mapping 272 automatically maps the select output attributes that contain the desired data results using the semantic annotations. In data cleanse operations, the semantic annotation selects attributes that contain the cleansed components, diagnostic information, and enrichment data to be output to a destination, such as destination 124 of FIG. 1. The destination 124 may be the same as the source 104 or may be directly to the database 119 or to another specified destination.

While FIG. 2 illustrates a data cleansing function, the other data quality functions 111 of FIG. 1 also include similar components including input mapping, output mapping, data quality rules and a data quality engine. In FIG. 2, the data quality engine is a data cleansing engine 276, but in other data quality functions an appropriate data quality engine would be included. For example, a data matching engine would be included as a component of the data matching function.

Referring also back to FIG. 1, each attribute in the pre-cleansed data 117 is tagged with a semantic annotation 113. The tagging process may be implemented through the use of the integrator application 126. A data steward may manually apply the annotations, a content identification process may programmatically apply them, or a text data processing routine may programmatically apply them.

With this semantic annotation, the data cleansing 116 programmatically configures the input mapping 270 using the input table 271. In this manner, designers of consuming applications do not need to know how to input map their attributes in order to obtain optimal cleansing results. For example, the application designer does not have to know that the delivery address attributes shipStreet, shipHouseNum, and shipUnit map to the multiple "mixed" fields in order of broadest to finest, as shown below in Table 2. The input mapping column in Table 2 below are the data quality input fields.

TABLE 2

| Attribute | Input Mapping |
| --- | --- |
| shipHouseNum | mixed2 |
| shipStreet | mixed |
| shipUnit | mixed3 |
| shipCity | locality |
| shipState | region |
| shipZip | postcode |
| shipCountry | country |

The semantic annotation definition consists of a hierarchy of levels. This provides flexibility in supporting the multiple ways of representing party data.

Consider the following formats of representing an address. As the address representations progress from composite to granular, the levels in the semantic annotation hierarchy progress from using only a top-level annotation to using the discrete-level annotations. Each of these formats maps differently in the data cleansing technology, but the consuming application designer only needs to know the contents of the attributes and not the nuances of mapping in the data cleansing technology.

Format 1—Composite

```
"cleanseInput": {
  "address": "2910 SPRING ROAD APARTMENT 320, CHICAGO
   ILLINOIS"   @<Semantics.address
}
```

Format 2—Partially discrete

```
"cleanseInput": {
  "address": "2910 SPRING ROAD APARTMENT 320"    @<Semantics.address.delivery.deliveryAddress,
  "city": "CHICAGO ILLINOIS"                     @<Semantics.address.cityRegionPostcode,
  "country": "UNITED STATES"                     @<Semantics.country
}
```

Format 3—More discrete

```
"cleanseInput": {
  "address": "2910 SPRING ROAD"   @<Semantics.address.delivery.deliveryAddress.primary,
  "unit": "APARTMENT 320"         @<Semantics.address.delivery.deliveryAddress.secondary,
  "city": "CHICAGO"               @<Semantics.address.cityRegionPostcode.city,
  "region": "ILLINOIS"            @<Semantics.address.cityRegionPostcode.region,
  "postcode": "60615"             @<Semantics.address.cityRegionPostcode.postcode,
  "country": "UNITED STATES"      @<Semantics.country
}
```

Format 4—Very discrete

```
"cleanseInput": {
  "houseNum": "2910"
@<Semantics.address.delivery.deliveryAddress.primary.houseNumber,
  "street": "SPRING ROAD"           @<Semantics.address.delivery.deliveryAddress.primary.street,
  "unit": "APARTMENT 320"           @<Semantics.address.delivery.deliveryAddress.secondary.unit,
  "floor": "3RD FLOOR"              @<Semantics.address.delivery.deliveryAddress.secondary.floor,
  "building": "HANNITY BUILDING"    @<Semantics.address.delivery.building,
  "streetSuppl": "PMB 20"           @<Semantics.address.delivery,
  "city": "CHICAGO"                 @<Semantics.address.cityRegionPostcode.city,
  "subCity": ""                     @<Semantics.address.cityRegionPostcode.subCity,
  "region": "ILLINOIS"              @<Semantics.address.cityRegionPostcode.region,
  "postcode": "60615"               @<Semantics.address.cityRegionPostcode.postcode,
  "country": "UNITED STATES"        @<Semantics.country
}
```

Consider the following formats of representing person name data. Again, as the representations progress from composite to discrete, the levels in the semantic annotation hierarchy progress from a top-level annotation to discrete-level annotations.

Format 1—Composite

```
"cleanseInput": {
  "patient": "ROBERT VINCENT HOLTER-FREY SR"
    @<Semantics.person.name
}
```

Format 2—Partially discrete

```
"cleanseInput": {
  "givenName": "ROBERT VINCENT"
    @<Semantics.person.name.givenName,
  "familyName": "HOLTER-FREY"
    @<Semantics.person.name.familyName,
  "suffix": "SR"  @<Semantics.person.name.suffix
}
```

Format 3—Very discrete

```
"cleanseInput": {
  "prefix": "MR"                    @<Semantics.person.name.prefix,
  "firstName": "ROBERT"             @<Semantics.person.name.givenName.givenName1,
  "middleName": "VINCENT"           @<Semantics.person.name.givenName.givenName2,
  "lastNamePaternal": "HOLTER"      @<Semantics.person.name.familyName.familyName1,
  "lastNameMaternal": "FREY"        @<Semantics.person.name.familyName.familyName2,
  "suffix": "SR"                    @<Semantics.person.name.suffix
}
```

With respect to the output mapping 272, each attribute in the requested cleansed data is tagged with a semantic annotation 113 in the data record 130. Consider the following Table 3 of shipping addresses for sales orders.

TABLE 3

| Address | City | State | Zip | Country |
|---|---|---|---|---|
| 2910 Spring Rd Apt 320 | Chicago | IL | 60615-2105 | US |
| 608 Bixby Dr | Tulsa | OK | 74129-9840 | US |
| 1810 Webster Ln Ste 165 | Charlotte | NC | 28203-4772 | US |

The source 104 sends the semantic annotation 113 for each output attribute requested to the data cleansing 116.

```
"cleanseOutput": {
    "shipAddress"   @<Semantics.address.delivery.deliveryAddress.primary.houseNumber,
    "shipCity"      @<Semantics.address.cityRegionPostcode.city,
    "shipState"     @<Semantics.address.cityRegionPostcode.region,
    "shipZip"       @<Semantics.address.cityRegionPostcode.postcode,
    "shipCountry"   @<Semantics.country
}
```

With this semantic annotation 113, the data cleansing 116 programmatically selects the appropriate output attributes that contain the cleansed data with output mapping referencing the output table 273. In this manner, designers of consuming applications do not need to search through hundreds of potential output attributes to find the ones that contain the data specific to their data model. Instead, output mapping 272 automatically maps the semantic annotations to the data quality output fields, as shown in the generated attribute column below in Table 4.

TABLE 4

| Attribute | Generated Attribute |
|---|---|
| Address | std_addr_address_delivery |
| City | std_addr_locality_full |
| State | std_addr_region_full |
| Zip | std_addr_postcode_full |
| Country | std_addr_country_2char |

The hierarchy of levels built into the semantic annotation definition provides flexibility in supporting the multiple ways of storing party data. For example, organizations that store address data in composite fields may use top-level annotations, and those that store address data in discrete fields may use the discrete-level annotations.

Format 1—Composite

```
"cleanseOutput": {
    "Address"   @<Semantics.address.delivery.deliveryAddress,
    "CSZ"       @<Semantics.address.cityRegionPostcode,
    "Country"   @<Semantics.country
}
```

Format 2—Discrete

```
"cleanseOutput": {
    "Street"     @<Semantics.address.delivery.deliveryAddress.primary.street,
    "HouseNum"   @<Semantics.address.delivery.deliveryAddress.primary.houseNumber,
    "Unit"       @<Semantics.address.delivery.deliveryAddress.secondary.unit,
    "Floor"      @<Semantics.address.delivery.deliveryAddress.secondary.floor,
    "Building"   @<Semantics.address.delivery.building,
    "City"       @<Semantics.address.cityRegionPostcode.city,
    "Subcity"    @<Semantics.address.cityRegionPostcode.subCity,
    "State"      @<Semantics.address.cityRegionPostcode.region,
    "Zip"        @<Semantics.address.cityRegionPostcode.postcode,
    "Country"    @<Semantics.country
}
```

Organizations may store dates in a composite field or in discrete fields.

Format 1—Composite

```
"cleanseOutput": {
    "Birthdate"   @<Semantics.calendar
}
```

Format 2—Discrete

```
"cleanseOutput": {
    "BirthYear"    @<Semantics.calendar.year,
    "BirthMonth"   @<Semantics.calendar.month,
    "BirthDay"     @<Semantics.calendar.dayOfMonth
}
```

The data record 130 may include the combination of multiple semantic annotations 113. The purpose for this is to allow the flexibility to define a custom attribute for which the current data cleansing technology does not offer an out-of-the-box annotation.

Since there are so many variations of storing data, it is possible that an organization defines an unconventional way of storing address data. For example, say a definition consists of storing the house number in one column, and the combination of the remaining street components and all secondary components in a second column. The semantic annotation definition includes an annotation for the house number, but not an annotation for all street data except the house number. Multiple annotations can be combined to construct this unconventional combination, illustrated here with the concatenation character "+".

```
"cleanseOutput": {
    "HouseNum"   @<Semantics.address.delivery.deliveryAddress.primary.houseNumber,
    "Street"     @<Semantics.address.delivery.deliveryAddress.primary.street +
                 @<Semantics.address.delivery.deliveryAddress.secondary
}
```

As another example, a credit card expiration date has month and year, not a full calendar date. To define this combination, the semantic annotations for month and year are combined.

```
"cleanseOutput": {
    "cardExpireDate"
        @<Semantics.calendar.month + @<Semantics.calendar.year
}
```

When multiple semantic annotations 113 are combined, the data cleansing 116 combines the components in the order listed in the concatenations with a space between, unless the format standardization annotation is applied. See the "Locale-specific formats" section in the "Standardization annotation" section below for details.

The type annotation provides the ability for a consuming application to define a named instance for an attribute or group of attributes. When the data model includes only a single instance of an entity then this feature is unnecessary. However, it is especially useful when there are multiple instances of an entity.

The value used for the type annotation is usually custom to the user. There are two purposes for the type annotation within the data cleansing technology, and neither of these need a specific value to meet the purpose.

1. Associating input to output. When inputting three phone number attributes, for example, the norm is that the request for output will also include three phone number attributes. The data cleansing 116 uses the type annotation to ensure that there is a one-to-one mapping between input attribute and cleansed output attribute.

2. Grouping multiple attributes. When inputting multiple instances of the same entity and each entity is represented by multiple attributes, there is a chance that the data cleansing technology can get confused. For example, say an education organization has a pair of first name and last name attributes for the student, and another pair of first name and last name attributes for the guardian. A robust data cleansing technology has rules that will likely identify this input scenario as two separate person entities, and associate the correct pairs of first name and last name attributes. However, these rules are based on probability and therefore there is the chance that either the wrong pair of attributes can be grouped, or the four attributes are determined to be a single person entity. When sending the multiple instances of multiple attributes with the type annotation, the data cleansing 116 can clearly group attributes of the same type into an entity without error.

For example, a data model may have three instances of phone number: home phone, work phone, mobile phone. In this scenario, there are three attributes with the same semantic annotation. The type annotation is what distinguishes them. Declare the type on the input attributes.

```
"cleanseInput": {
    "HomePhone": "3126082183"    @<Semantics.phone(type:Home),
    "WorkPhone": "8886081900"    @<Semantics.phone(type:Work),
    "MobilePhone": "3123947218"  @<Semantics.phone(type:Mobile)
}
```

Then define which attribute in the output to send each of the cleansed phone numbers.

```
"cleanseOutput": {
    "HomePhone"    @<Semantics.phone(type:Home),
    "WorkPhone"    @<Semantics.phone(type:Work),
    "MobilePhone"  @<Semantics.phone(type:Mobile)
}
```

The one-to-one mapping does not require one-to-one attributes. Instead, it is a one-to-one of entity regardless of its schema on input and its schema on output. For example, the same input above can have a different data model schema on output. Notice that the one attribute with type "Home" in the input splits into two attributes with type "Home" in the output, and likewise with the other phone numbers.

```
"cleanseOutput": {
    "HomePhoneAreaCode"    @<Semantics.phone.areaCode(type:Home),
    "HomePhoneNumber"      @<Semantics.phone.subscriberNumber(type:Home),
    "WorkPhoneAreaCode"    @<Semantics.phone.areaCode(type:Work),
    "WorkPhoneNumber"      @<Semantics.phone.subscriberNumber(type:Work),
    "MobilePhoneAreaCode"  @<Semantics.phone.areaCode(type:Mobile),
    "MobilePhoneNumber"    @<Semantics.phone.subscriberNumber(type:Mobile)
}
```

It is very common for address data to reside in multiple attributes. In this case, apply the same type to each attribute in the group. The advantage for doing this is to provide the data cleansing 116 with a clear grouping of attributes. The following is an example of sending two addresses, one with multiple attributes representing the shipping address and one with multiple attributes representing the billing address. The first group of three attributes have the type of "Shipping", and the second group of three attributes have the type of "Billing".

```
"cleanseInput": {
    "shipAddr": "2910 SPRING ROAD"
@<Semantics.address.delivery.deliveryAddress(type:Shipping),
    "shipCSZ": "CHICAGO ILLINOIS"    @<Semantics.address.cityRegionPostcode(type:Shipping),
    "shipCntry": "UNITED STATES"     @<Semantics.country(type:Shipping),
    "billAddr": "2910 SPRING ROAD"
@<Semantics.address.delivery.deliveryAddress(type:Billing),
    "billCSZ": "CHICAGO ILLINOIS"    @<Semantics.address.cityRegionPostcode(type:Billing),
    "billCntry": "UNITED STATES"     @<Semantics.country(type:Billing)
}
```

Then, define for each output attribute which address object it applies to, Shipping or Billing. Notice that each address object has three attributes in the input, and five attributes in the output.

```
"cleanseOutput": {
    "shipAddress"   @<Semantics.address.delivery.deliveryAddress(type:Shipping),
    "shipCity"      @<Semantics.address.cityRegionPostcode.city(type:Shipping),
    "shipState"     @<Semantics.address.cityRegionPostcode.region(type:Shipping),
    "shipZip"       @<Semantics.address.cityRegionPostcode.postcode(type:Shipping),
    "shipCountry"   @<Semantics.country(type:Shipping),
    "billAddress"   @<Semantics.address.delivery.deliveryAddress(type:Billing),
    "billCity"      @<Semantics.address.cityRegionPostcode.city(type:Billing),
    "billState"     @<Semantics.address.cityRegionPostcode.region(type:Billing),
    "billZip"       @<Semantics.address.cityRegionPostcode.postcode(type:Billing),
    "billCountry"   @<Semantics.country(type:Billing)
}
```

The type annotation also has some reserved terms that provide meaning for specific scenarios. These built-in types, which are prefixed with "dq" in order to prevent clashing with user-defined types, are used by the data cleansing 116 to drive specific data cleansing scenarios.

One reserved term is "dqMatch". This type is applied to output attributes that contain match preparation data that is generated by the data cleansing 116 for the specific purpose of optimal duplicate detection in a subsequent matching process. The following is an example of generating in the data cleansing 116 the 19 attributes with address data required when using the address match policy in the SAP HANA match operation.

```
"cleanseOutput": {
    "match_addr_country"       @<Semantics.country(type:dqMatch),
    "match_addr_postcode1"
@<Semantics.address.cityRegionPostcode.postcode.postcode1(type:dqMatch),
    "match_addr_region"        @<Semantics.address.cityRegionPostcode.region(type:dqMatch),
    "match_addr_locality"      @<Semantics.address.cityRegionPostcode.city(type:dqMatch),
    "match_addr_locality2"     @<Semantics.address.cityRegionPostcode.subCity(type:dqMatch),
    "match_addr_building"      @<Semantics.address.delivery.building(type:dqMatch),
    "match_addr_prim_name"     @<Semantics.address.deliveryAddress.primary.street(type:dqMatch),
    "match_addr_prim_name2"    @<Semantics.address.deliveryAddress.primary.street2(type:dqMatch),
    "match_addr_prim_type"
@<Semantics.address.deliveryAddress.primary.street.type(type:dqMatch),
    "match_addr_prim_dir"
@<Semantics.address.deliveryAddress.primary.street.direction(type:dqMatch,
    "match_addr_prim_number"
@<Semantics.address.deliveryAddress.primary.houseNumber(type:dqMatch),
    "match_addr_block"         @<Semantics.address.deliveryAddress.secondary.block(type:dqMatch),
    "match_addr_wing"          @<Semantics.address.deliveryAddress.secondary.wing(type:dqMatch),
    "match_addr_stairwell"
@<Semantics.address.deliveryAddress.secondary.stairwell(type:dqMatch),
    "match_addr_floor"         @<Semantics.address.deliveryAddress.secondary.floor(type:dqMatch),
    "match_addr_unit"          @<Semantics.address.deliveryAddress.secondary.unit(type:dqMatch),
    "addr_script_code"         @<Semantics.diagnostic.address.scriptCode(type:dqMatch),
    "addr_asmt_level"          @<Semantics.diagnostic.address.assignmentLevel(type:dqMatch),
    "addr_asmt_type"           @<Semantics.diagnostic.address.assignmentType(type:dqMatch)
}
```

The dqMatch type annotation is then applied to the address attributes input to the matching technology.

Another reserved set of terms is "dqSuiteStreetAddress" and "dqSuitePostboxAddress" These types are applied to input attributes that contain address data stored in the schema that exists in the SAP Business Suite data model.

Since this is a known schema to SAP systems, by including the built-in types to the two address objects, the data cleansing 116 can perform logic specific to the known nuances of storing address data in this data model schema. Notice that the first 16 attributes have type "dqSuiteStreetAddress" and the last five attributes have type "dqSuitePostboxAddress".

```
"cleanseInput": {
    "street": "SPRING ROAD"
@<Semantics.address.delivery.deliveryAddress.primary.street(type:dqSuiteStreetAddress),
    "house_num": "2910"
@<Semantics.address.delivery.deliveryAddress.primary.houseNumber(type:dqSuiteStreetAddress),
    "house_num2": "STE 320"
@<Semantics.address.delivery.deliveryAddress.secondary.unit(type:dqSuiteStreetAddress),
    "floor": "3"
@<Semantics.address.delivery.deliveryAddress.secondary.floor(type:dqSuiteStreetAddress),
    "roomnumber": ""
@<Semantics.address.delivery.deliveryAddress.secondary.room(type:dqSuiteStreetAddress),
    "building": ""         @<Semantics.address.delivery.building(type:dqSuiteStreetAddress),
    "str_suppl": "PMB 20"  @<Semantics.address.delivery(type:dqSuiteStreetAddress),
    "str_suppl2": ""       @<Semantics.address.delivery(type:dqSuiteStreetAddress),
    "str_suppl3": ""       @<Semantics.address.delivery(type:dqSuiteStreetAddress),
    "location": ""         @<Semantics.address.delivery(type:dqSuiteStreetAddress),
    "city1": "CHICAGO"     @<Semantics.address.cityRegionPostcode.city(type:dqSuiteStreetAddress),
    "home_city": ""        @<Semantics.address.cityRegionPostcode.subCity(type:dqSuiteStreetAddress),
    "city2": ""            @<Semantics.address.cityRegionPostcode.subCity2(type:dqSuiteStreetAddress),
    "region": "ILLINOIS"   @<Semantics.address.cityRegionPostcode.region(type:dqSuiteStreetAddress),
    "post_code1": "60615"  @<Semantics.address.cityRegionPostcode.postcode(type:dqSuiteStreetAddress),
    "country": "US"        @<Semantics.country(type:dqSuiteStreetAddress),
    "po_box": "5500"
```

```
               @<Semantics.address.delivery.deliveryAddress.primary.houseNumber(type:dqSuitePostboxAddress),
  "po_box_loc": ""       @<Semantics.address.cityRegionPostcode.city(type:dqSuitePostboxAddress),
  "po_box_reg": ""       @<Semantics.address.cityRegionPostcode.region(type:dqSuitePostboxAddress),
  "post_code2": "60601"  @<Semantics.address.cityRegionPostcode.postcode(type:dqSuitePostboxAddress),
  "po_box_cty": ""       @<Semantics.country(type:dqSuitePostboxAddress)
}
```

Then define for each output attribute which address object 10 it applies to, dqSuiteStreetAddress or dqSuitePostboxAddress.

```
"cleanseOutput": {
  "street"
@<Semantics.address.delivery.deliveryAddress.primary.street(type:dqSuiteStreetAddress)+
@<Semantics.address.delivery.deliveryAddress.primary.street2(type:dqSuiteStreetAddress)+
@<Semantics.address.delivery.deliveryAddress.primary.street3(type:dqSuiteStreetAddress)+
@<Semantics.address.delivery.deliveryAddress.primary.street4(type:dqSuiteStreetAddress),
   "house_num"
@<Semantics.address.delivery.deliveryAddress.primary.houseNumber(type:dqSuiteStreetAddress),
   "house_num2"
@<Semantics.address.delivery.deliveryAddress.secondary.block(type:dqSuiteStreetAddress)+
@<Semantics.address.delivery.deliveryAddress.secondary.wing(type:dqSuiteStreetAddress)+
@<Semantics.address.delivery.deliveryAddress.secondary.stairwell(type:dqSuiteStreetAddress)+
@<Semantics.address.delivery.deliveryAddress.secondary.unit(type:dqSuiteStreetAddress),
   "floor"
@<Semantics.address.delivery.deliveryAddress.secondary.floor(type:dqSuiteStreetAddress),
   "roomnumber"
@<Semantics.address.delivery.deliveryAddress.secondary.room(type:dqSuiteStreetAddress),
   "str_suppl"     @<Semantics.address.delivery.building(type:dqSuiteStreetAddress),
   "str_suppl3"    @<Semantics.address.delivery.pointOfReference(type:dqSuiteStreetAddress),
   "location"      @<Semantics.address.cityRegionPostcode.subCity2(type:dqSuiteStreetAddress)+
                   @<Semantics.address.cityRegionPostcode.subCity3(type:dqSuiteStreetAddress),
   "city1"         @<Semantics.address.cityRegionPostcode.city(type:dqSuiteStreetAddress),
   "home_city"     @<Semantics.address.cityRegionPostcode.subCity(type:dqSuiteStreetAddress),
   "region"        @<Semantics.address.cityRegionPostcode.region(type:dqSuiteStreetAddress),
   "post_code1"    @<Semantics.address.cityRegionPostcode.postcode(type:dqSuiteStreetAddress),
   "country"       @<Semantics.country(type:dqSuiteStreetAddress),
   "po_box"
@<Semantics.address.delivery.deliveryAddress.primary.houseNumber(type:dqSuitePostboxAddress),
   "po_box_loc"    @<Semantics.address.cityRegionPostcode.city(type:dqSuitePostboxAddress),
   "po_box_reg"    @<Semantics.address.cityRegionPostcode.region(type:dqSuitePostboxAddress),
   "post_code2"    @<Semantics.address.cityRegionPostcode.postcode(type:dqSuitePostboxAddress),
   "po_box_cty"    @<Semantics.country(type:sapPostboxAddress)
}
```

The type annotation supports combining multiple types by listing them separated by a comma. For example, request the match prepared output attributes for the SAP Business Suite street address with the two types, "type: dqSuiteStreetAddress,dqMatch".

Another reserved term is "dqAddressSuggestion". This type is applied to output attributes that contain suggestion list results generated by the address cleanse process. Following is an example of requesting the normal cleansed attributes and suggestion list attributes.

Input attributes:

```
"cleanseInput": {
  "Addr": "2910 SPRING ROAD"   @<Semantics.address.delivery,
  "CSZ": "CHICAGO ILLINOIS"    @<Semantics.address.cityRegionPostcode,
  "Cntry": "UNITED STATES"     @<Semantics.country,
  "Suggestion_Reply": ["2"]
@<Semantics.address.suggestionSelection(type:dqAddressSuggestion)
}
```

Output attributes:

```
"cleanseOutput": {
    "Address"           @<Semantics.address.delivery,
    "City"              @<Semantics.address.cityRegionPostcode.city,
    "State"             @<Semantics.address.cityRegionPostcode.region,
    "Zip"               @<Semantics.address.cityRegionPostcode.postcode,
    "Country"           @<Semantics.country,
    "Suggestions" [
       "Sugg_Selection",            @<Semantics.address.suggestionSelection(type:dqAddressSuggestion),
       "Sugg_Address_Line"          @<Semantics.address.delivery(type:dqAddressSuggestion),
       "Sugg_CSZ_Line"              @<Semantics.address.cityRegionPostcode(type:dqAddressSuggestion),
       "Sugg_PrimNum_Low"           @<Semantics.address.delivery.deliveryAddress.primary.houseNumber.
                                         number.low(type:dqAddressSuggestion),
       "Sugg_PrimNum_High"          @<Semantics.address.delivery.deliveryAddress.primary.houseNumber.
                                         number.high(type:dqAddressSuggestion),
       "Sugg_Prim_Side_Ind"         @<Semantics.address.delivery.deliveryAddress.primary.
                                         sideIndicator(type:dqAddressSuggestion),
       "Sugg_SecNum_Low"            @<Semantics.address.delivery.deliveryAddress.secondary.
                                         unit.number.low(type:dqAddressSuggestion),
       "Sugg_SecNum_High"           @<Semantics.address.delivery.deliveryAddress.secondary.
                                         unit.number.high(type:dqAddressSuggestion),
       "Sugg_Sec_Side_Ind"          @<Semantics.address.delivery.deliveryAddress.secondary.
                                         sideIndicator(type:dqAddressSuggestion)
    ]
}
```

Another reserved term is "dqGeoSearch". This type is applied to output attributes that contain results generated by one of the geo-location search features of reverse geo, spatial point-of-interest search, or textual point-of-interest search. The following is an example of requesting attributes in the geo search results.

Input attributes:

```
"cleanseInput": {
    "Latitude": "41.898393"     @<Semantics.geoLocation.latitude,
    "Longitude": "-87.624022"   @<Semantics.geoLocation.longitude,
    "Radius": "1"               @<Semantics.geoLocation.distance,
    "Unit": "KILOMETERS"        @<Semantics.geoLocation.distanceUnit
}
```

Output attributes:

```
"cleanseOutput": {
    "Address"           @<Semantics.address.delivery,
    "City"              @<Semantics.address.cityRegionPostcode.city,
    "State"             @<Semantics.address.cityRegionPostcode.region,
    "Zip"               @<Semantics.address.cityRegionPostcode.postcode,
    "Country"           @<Semantics.country,
    "Geo_Search_Results" [
       "Search_POI"          @<Semantics.organization(type:dqGeoSearch),
       "Search_Address"      @<Semantics.address.delivery(type:dqGeoSearch),
       "Search_City"         @<Semantics.address.cityRegionPostcode.city(type:dqGeoSearch),
       "Search_State"        @<Semantics.address.cityRegionPostcode.region(type:dqGeoSearch),
       "Search_Zip"          @<Semantics.address.cityRegionPostcode.postcode(type:dqGeoSearch),
       "Search_Country"      @<Semantics.country(type:dqGeoSearch),
       "Search_Latitude"     @<Semantics.geoLocation.latitude(type:dqGeoSearch),
       "Search_Longitude"    @<Semantics.geoLocation.longitude(type:dqGeoSearch),
       "Search_Distance"     @<Semantics.geoLocation.distance(type:dqGeoSearch)
    ]
}
```

The data quality annotation 115, also referred to interchangeably herein as the dqCleanse annotation in the context of a data cleanse function, defines how data in an attribute is standardized and formatted. While semantic annotations 113 control what data is inserted into an annotation during the cleanse process, the data quality annotation 115, or the dqCleanse annotation, defines the business rules applied to the data. The data quality annotation 115, or the dqCleanse annotation definition, controls the selection of settings step in the data quality configuration. For other data quality functions, such as data matching, data consolidation, data masking and data validation, the data quality annotation may be coded to identify the particular data quality function. For instance, the data quality annotation may be annotated as dqMatch for a data matching function or dqMask for a data masking function. The examples provided herein are in the context of a data cleanse function, but the concepts presented apply equally to the other types of data quality functions.

In the following example, the "Customer" attribute includes the semantic annotation 113 requesting to output the full person name into the attribute, and includes the data quality annotation 115 requesting to format the data in mixed case, keeping diacritics.

```
"cleanseOutput": {
    "Customer"     @<Semantics.person.name
                   @<dqCleanse.person.name(casing:mixed
                   diacritics:include)
}
```

The data quality annotation 115 may be applied to any semantic annotation 113 in the hierarchy. This allows for special standardization of particular data components differently than the other components in a composite attribute.

For example, to upper case the last name but mix case the other components in the name, which is a common format in French locales, include the casing standardization annotation to the full name and then a different casing standardization for the last name. Applying a dqCleanse annotation to a finer level of the hierarchy serves as an override to the same dqCleanse annotation at a broader level.

```
"cleanseOutput": {
   "Customer"    @<Semantics.person.name
                 @<dqCleanse.person.name(casing:mixed
                 diacritics:include)
                 @<dqCleanse.person.name.familyName
                 (casing:upper)
}
```

When applying mixed case standardization to the entire name, the cleansed data formats as follows:
Mr. Robert Vincent Moore Sr.

When applying mixed case standardization to the entire name, then overriding with upper case standardization for the last name, the cleansed data formats as follows:
Mr. Robert Vincent MOORE Sr.

Data quality annotations 115 are applied to the component for which they are defined, independent of whether the component is requested as a discrete attribute or as part of a composite attribute. For example, to control the language of a generated name prefix, include the language dqCleanse annotation to the name prefix. The result is that the prefix is returned as the German "Hr." or "Fr." instead of the English "Mr." or "Ms."

```
"cleanseOutput": {
   "CustTitle"       @<Semantics.person.name.prefix
                     @<Standardization.person.name.prefix
                     (language:de),
   "CustFirstname"   @<Semantics.person.name.givenName,
   "CustLastname"    @<Semantics.person.name.familyName,
   "CustPostname"    @<Semantics.person.name.suffix
}
```

However, the language dqCleanse annotation may be included for the name prefix even when requesting the full name attribute. The data quality annotation 115 tells the data cleansing 116 to use the German form of the prefix when building up the full person name.

```
"cleanseOutput": {
   "Customer"    @<Semantics.person.name
                 @<dqCleanse.person.name(casing:mixed
                 diacritics:include)
                 @<dqCleanse.person.name.prefix(language:de)
}
```

In this example, a dqCleanse annotation is applied to the street name component, applying upper case to the street name even though the rest of the components in the street address attribute are mixed case.

```
"cleanseOutput": {
   "Address"   @<Semantics.address.delivery.deliveryAddress
               @<dqCleanse.address.delivery.deliveryAddress
               (casing:mixed diacritics:include),
```

-continued

```
               @<dqCleanse.address.delivery.deliveryAddress.primary.street.name
               (casing:mixed),
   "City"      @<Semantics.address.CityRegionPostcode.city,
   "State"     @<Semantics.address.CityRegionPostcode.region,
   "Zip"       @<Semantics.address.CityRegionPostcode.postcode,
   "Country"   @<Semantics.country
}
```

When requesting lower level discrete attributes, a dqCleanse annotation may be applied to a top-level node and it will be inherited by all lower-level attributes for that top-level attribute. This avoids repeating the same dqCleanse annotation for every discrete component. For example, add a dqCleanse annotation to the full person name without requesting the composite person name attribute. The standardization rule applies to all components below that node in the semantic annotation hierarchy.

```
"cleanseOutput":  {
   "CustTitle"       @<Semantics.person.name.prefix
   "CustFirstname"   @<Semantics.person.name.givenName,
   "CustLastname"    @<Semantics.person.name.familyName,
   "CustPostname"    @<Semantics.person.name.suffix,
                     @<dqCleanse.person.name(casing:mixed diacritics:include)
}
```

Data quality annotations provide control over the order of components below the node in the semantic annotation hierarchy, and the delimiters to insert between the components. When generating discrete date attributes, apply the format dqCleanse annotation to each discrete attribute. The following example shows how to request 4-digit year format, and zero padding the month and day.

```
"cleanseOutput":  {
   "BirthYear"    @<Semantics.calendar.year
                  @<dqCleanse.calendar.year(format:yyyy),
   "BirthMonth"   @<Semantics.calendar.month,
                  @<dqCleanse.calendar.month(format:mm),
   "BirthDay"     @<Semantics.calendar.dayOfMonth
                  @<dqCleanse.calendar.dayOfMonth(format:dd)
}
```

However, when generating the composite date attribute, the format dqCleanse annotation requests not only the formatting of the individual components, but also sends the data cleansing technology rules for how to order the components of the date and what delimiter to insert between the components.

```
"cleanseOutput":  {
   "Birthdate"   @<Semantics.calendar
                 @<dqCleanse.calendar(year(format:yyyy)+"-
"+month(format:mm)+"-"+dayOfMonth(format:dd))
}
```

The data quality annotation offers default formats for attributes. This is to avoid users from having to know what is best practice formatting for multiple locales. Including the default format dqCleanse annotation is optional, since the default action is what will be applied when dqCleanse annotations are omitted. The order of address components varies greatly from country to country. For example, in the United States the order is house number+street name+street type, in Brazil the order is street type+street name+house number, and in Germany the order is street name+street type (often attached to the street)+house number. Some countries do not even include a street name in their representation of an address. For example:
United States: 100 Main Street
Brazil: Street Main 100
Germany: MainStreet 100

When generating an attribute with the composite semantic annotation @<Semantic.address.delivery.deliveryAddress, the default dqCleanse format will always be used. The result is that the data cleansing 116 automatically orders components and places delimiters as appropriate, according to country-specific address format rules, which may be found as part of the reference data 112.

As noted above in the semantic annotation description, when multiple semantic annotations are combined, the data cleansing 116 combines the components in the order listed in the concatenations with a space between. Therefore, in order to obtain country-specific address format rules for a custom combination of semantic annotations, explicitly apply the default format data quality annotation.

In the following example, the Street attribute includes the combination of the primary address components (without the house number) and all secondary address components. The default format data quality annotation is applied to all components in this custom attribute.

```
"cleanseOutput": {
    "HouseNum"    @<Semantics.address.delivery.deliveryAddress.primary.houseNumber,
    "Street"      @<Semantics.address.delivery.deliveryAddress.primary.street +
                  @<Semantics.address.delivery.deliveryAddress.secondary
                  @<dqCleanse.address.delivery.deliveryAddress(format:default)
}
```

The default format data quality annotation is also very useful when generating a full person name attribute, because the order of name components varies from locale to locale. For example, in the United States the order is given name+family name, in Hungary the order is family name+given name, and in China when written in Chinese script the order is family name+given name without a space between. For example:
United States: John Smith
Hungary: Smith John
China: SmithJohn When a custom set of semantic annotations are combined, the default format may be applied in order to take advantage of obtaining the locale-specific ordering format.

```
"cleanseOutput": {
    "Customer"    @<Semantics.person.name.givenName +
                  @<Semantics.person.name.familyName
                  @<dqCleanse.person.name(casing:mixed
                  diacritics:include format:default)
}
```

The data quality annotation definition allows for selecting which representation to include when multiple variations exist for an attribute.

In one implementation, the data cleansing 116 can generate four different representations of country data.
1. Country name, for example United States, Deutschland, and 中国
2. 2-character ISO country code, for example US, DE, and CN
3. 3-character ISO country code, for example USA, DEU, and CHN
4. 3-digit ISO country code, for example 840, 276, and 156
The variation data quality annotation allows the user to select which variation to generate. Following is an example of requesting the 2-character ISO country code.

```
"cleanseOutput": {
    "Country"    @<Semantics.country
                 @<dqCleanse.country(variation:country2Char)
}
```

When requesting multiple variations of the same component, the attributes have the same semantic annotation but different variation data quality annotations. The following is an example of requesting both the country name and the 2-character ISO country code.

```
"cleanseOutput": {
    "Country"        @<Semantics.country
                     @<dqCleanse.country(variation:countryName),
    "CountryCode"    @<Semantics.country
                     @<dqCleanse.country(variation:country2Char)
}
```

The following is an example for requesting an attribute to hold the full email address. For example, the full email address "kenji.abe@city.tatsuno.hyogo.jp" would be output to this attribute.

```
"cleanseOutput": {
    "Email"    @<Semantics.email.address
}
```

The following is an example for requesting the email split into two attributes, one for the local part and one for the domain. Using the previous example, EmailUserName would contain "kenji.abe", and EmailDomainName would contain "city.tatsuno.hyogo.jp".

```
"cleanseOutput": {
    "EmailUserName"      @<Semantics.email.address.local,
    "EmailDomainName"    @<Semantics.email.address.domain
}
```

However, use the variation dqCleanse annotation to request the various parts of the domain split into multiple attributes. Using the example, EmailUserName would contain "kenji.abe", EmailHostDomain would contain "city", EmailTopLevelDomain would contain "jp", EmailSecondLevelDomain would contain "hyogo", and EmailThirdLevelDomain would contain "tatsuno".

```
"cleanseOutput": {
    "EmailUserName"         @<Semantics.email.address.local
    "EmailHostDomain"       @<Semantics.email.address.domain.subDomain
                            @<dqCleanse.email.address.domain.subDomain(variation:host),
    "EmailTopLevelDomain"   @<Semantics.email.address.domain.subDomain
                            @<dqCleanse.email.address.domain.subDomain(variation:topLevel),
    "EmailSecondLevelDomain" @<Semantics.email.address.domain.subDomain
                            @<dqCleanse.email.address.domain.subDomain(variation:level2),
    "EmailThirdLevelDomain" @<Semantics.email.address.domain.subDomain
                            @<dqCleanse.email.address.domain.subDomain(variation:level3)
}
```

The variation data quality annotation and the type semantic annotation are combined in order to generate match standards. Match standards are variations of person name and organization name data, existing as match preparation attributes, for the purpose of accurately matching nicknames to full names, "aka" organization names to an official organization name, and person and organization names represented in different scripts. Below is an example of requesting the match prepared first name with six first name match standard attributes.

```
"cleanseOutput": {
    "match_person_gn"      @<Semantics.person.name.givenName.givenName1(type:dqMatch),
    "match_person_gn_std"  @<Semantics.person.name.givenName.givenName1(type:dqMatch)
                           @<dqCleanse.person.name.givenName.givenName1(variation:matchStd),
    "match_person_gn_std2" @<Semantics.person.name.givenName.givenName1(type:dqMatch)
                           @<dqCleanse.person.name.givenName.givenName1(variation:matchStd2),
    "match_person_gn_std3" @<Semantics.person.name.givenName.givenName1(type:dqMatch)
                           @<dqCleanse.person.name.givenName.givenName1(variation:matchStd3),
    "match_person_gn_std4" @<Semantics.person.name.givenName.givenName1(type:dqMatch)
                           @<dqCleanse.person.name.givenName.givenName1(variation:matchStd4),
    "match_person_gn_std5" @<Semantics.person.name.givenName.givenName1(type:dqMatch)
                           @<dqCleanse.person.name.givenName.givenName1(variation:matchStd5),
    "match_person_gn_std6" @<Semantics.person.name.givenName.givenName1(type:dqMatch)
                           @<dqCleanse.person.name.givenName.givenName1(variation:matchStd6)
}
```

Many data quality annotations 115 are applied to output attributes because they provide the user with control over how to standardize data. However, some data quality annotations are applied to input attributes because they provide the user with control over how the data is input. Consider the scenario in which an organization primarily does business with customers in the United States, but a small percentage of customers in other countries. The way they retrieve data is that the country field is populated for other countries, but the country field is blank for United States addresses because it can be assumed they are United States. Below is an example of a data quality annotation that tells the data cleansing technology that the default country is United States. It is sent with the attribute that has the semantic annotation for country

```
"cleanseInput": {
    "address": "2910 SPRING ROAD"  @<Semantics.address.delivery.deliveryAddress.primary,
    "city": "CHICAGO"              @<Semantics.address.cityRegionPostcode.city,
    "region": "ILLINOIS"           @<Semantics.address.cityRegionPostcode.region,
    "postcode": "60615"            @<Semantics.address.cityRegionPostcode.postcode,
    "country": ""                  @<Semantics.country
                                   @<dqCleanse.country(default:US)
}
```

The following order data quality annotation tells the data cleansing 116 that it should assume the name order of first name+last name when the person name sent in the request is ambiguous as to the order of first name and last name. In this example, the order data quality annotation would be used to determine whether the name is Gordon Craig or Craig Gordon.

```
"cleanseInput": {
    "patient": "GORDON    @<Semantics.person.name
    CRAIG"
                          @<dqCleanse.person.name(order:firstLast)
}
```

For countries that allow address data to be represented in multiple scripts, the script data quality annotation may be used to specify which script is desired for the cleansed address. For example, addresses in Russia may be represented in Cyrillic or in Latin. Below is an example of requesting the full address, including the country, to be returned in Cyrillic script.

```
"cleanseOutput":    {
   "Address"        @<Semantics.address.delivery.deliveryAddress
   "City"           @<Semantics.address.CityRegionPostcode.city,
   "State"          @<Semantics.address.CityRegionPostcode.region,
   "Zip"            @<Semantics.address.CityRegionPostcode.postcode,
   "Country"        @<Semantics.country,
   @<dqCleanse.address(script:cyrillic),
   @<dqCleanse.country(script:cyrillic)
}
```

The "isSensitive" data quality annotation is used to flag an attribute as sensitive data. The data is stored in its original state, but applications that query data for display to users who do not have authorization to view the data will use this flag to trigger a data masking rule when displaying. For example, the social security number 283-94-6807 will be displayed as *--6807 if the data masking rule is configured to display only the last four digits.

```
"cleanseOutput": {
   "SSN"           @<Semantics.personNationalID.-
                   usSSN(isSensitive:true),
}
```

Furthermore, data quality annotations may be used in order to flag records that do not meet validation requirements. Data quality annotations may be used in order to define conditions for when other dqCleanse annotations have effect. Data quality annotation may define match policies that drive duplicate detection requirements.

Figure 3:
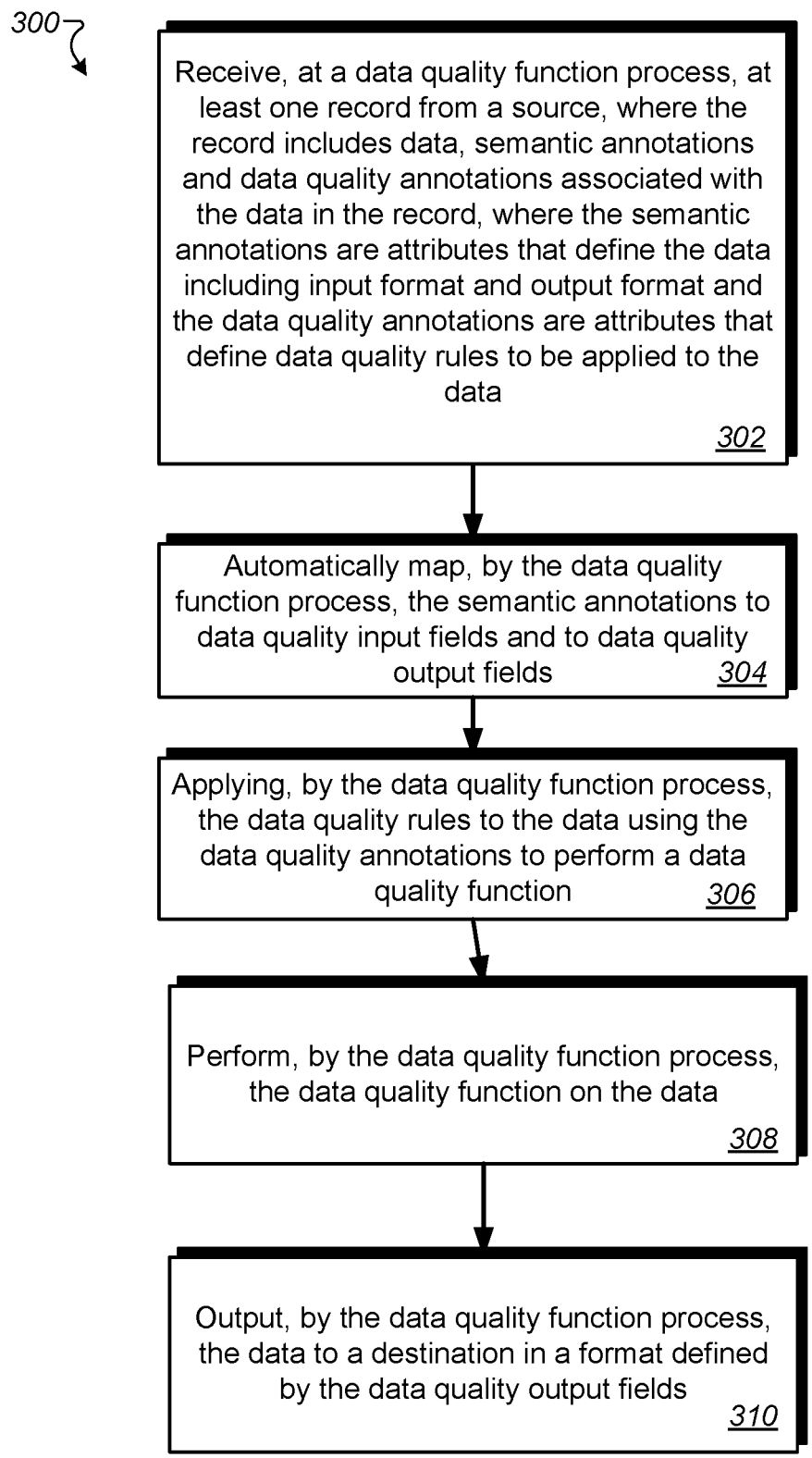
FIG. 3 is a flowchart illustrating example operations of the system of FIG. 1.

Referring to FIG. 3, process 300 illustrates example operations of the system 100 of FIG. 1. Process 300 includes receiving, at a data quality function process, at least one record from a source, where the record includes data, semantic annotations and data quality annotations associated with the data in the record, where the semantic annotations are attributes that define the data including input format and output format and the data quality annotations are attributes that define data quality rules to be applied to the data (302). For example, the data quality functions 111 on the cloud computing server 108 receive at least one record 130 from a source 104. The record 130 includes data 117, semantic annotations 113 and data quality annotations 115. More specifically, any one of the data quality functions 111 may perform the selected data quality function on the received record. The received data record includes information indicating which one or ones of the data quality functions 111 are to be performed.

Process 300 includes automatically mapping, by the data quality function process, the semantic annotations to data quality input fields and to data quality output fields (304). For example, the input mapping 270 automatically maps the input semantic annotations to data quality input fields using the input table 271 and the data quality rules 275. Table 2 above is an example result of the mapping of the input semantic annotations to data quality input fields. The output mapping 272 automatically maps the output semantic annotations to data quality output fields using the output table 273 and the data quality rules 275. Table 4 above is an example result of the mapping of the output semantic annotations to the data quality output fields.

Process 300 includes applying, by the data quality function process, the data quality rules to the data using the data quality annotations to perform a data quality function (306). For example, the data cleanse engine 276 may apply the data quality rules to the data 117 using the data quality annotations 115.

Process 300 also include performing, by the data quality function process, the data quality function on the data (308) and outputting, by the data quality function process, the data to a destination in a format defined by the data quality output fields (310). For example, the data cleanse engine 276 may perform the data cleanse process on the data and output the data to the destination 124 in the format defined by the data quality output fields.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for performing a data quality function, the method comprising:
   receiving, by an execution of a data quality function process, at least one record from a source, wherein the record includes data, semantic annotations and data quality annotations associated with the data in the record, wherein
      the semantic annotations are attributes arranged hierarchically in accordance with a plurality of discrete levels of granularity and defining a type of data contained in each attribute, an input mapping for automatically mapping one or more of the semantic annotations to one or more data quality input fields by the execution of the data quality function process, and output mapping for selecting and automatically mapping one or more output attributes that contain desired data results using the semantic annotations by the execution of the data quality function process, the semantic annotations including one or more type annotations for executing the input mapping and the output mapping, the one or more type annotations defining a named instance for an attribute of the data and including a match annotation that is applied to output attributes that contain match data for detecting duplicates and distinguishing between attributes of the data, wherein execution of the data quality function process, based on the one or more type annotations, groups the one or more output attributes having different data model schema than data model schema of corresponding input attributes, in accordance with a type annotation of the one or more input attributes, and
      the data quality annotations are attributes that define locale-specific data quality rules to be applied to the data at each of the plurality of discrete levels of granularity, wherein one or more data quality annotations is configured to be applied to one or more semantic annotations to define one or more composite attributes, wherein the data quality annotations include a masking attribute defining a locale-specific data masking rule preventing access to data without authorization, the data quality annotations include one or more variation data quality annotations for executing selection of a variation of data in one or more data quality output fields, the one or more variation data quality annotations defining a plurality of selectable variations of an attribute of the data, wherein the one or more type annotations and the one or more variation data quality annotations are used to generate one or more matching standards defining one or more alternatives of matching data to data quality output fields;
   automatically mapping, by the execution of the data quality function process, the semantic annotations to the data quality input fields and to data quality output fields in accordance with the hierarchical arrangement of the semantic annotations and locale-specific data quality rules;
   applying, by the execution of the data quality function process, the data quality rules to the data using the data quality annotations to perform a data quality function having one or more composite attributes;
   performing, by the execution of the data quality function process, the data quality function on the data; and
   outputting, by the execution of the data quality function process, using the one or more generated matching standards, the data to a destination in a format defined by the data quality output fields, wherein at least a portion of data is masked in accordance with the data masking rule.

2. The method as in claim 1 wherein the semantic annotations include a combination of multiple semantic annotations that define a custom output format for the data.

3. The method as in claim 1 wherein the data quality annotation is applied to an output attribute of the data.

4. The method as in claim 1 wherein the data quality annotation is applied to an input attribute of the data.

5. The method as in claim 1 wherein the data quality function includes a data quality cleanse process.

6. The method as in claim 1 wherein the data quality function includes a data quality matching process.

7. The method as in claim 1 wherein the data record is a single record.

8. The method as in claim 1 wherein the data record is a batch of multiple data records.

9. A system for performing a data quality function, the system comprising:
   at least one memory including instructions on a computing device; and
   at least one processor on the computing device, wherein the processor is operably coupled to the at least one memory and is arranged and configured to execute the instructions that, when executed, cause the processor to implement:
      receiving at least one record from a source, wherein the record includes data, semantic annotations and data quality annotations associated with the data in the record, wherein
         the semantic annotations are attributes arranged hierarchically in accordance with a plurality of discrete levels of granularity and defining a type of data contained in each attribute, an input mapping for automatically mapping one or more of the semantic annotations to one or more data quality input fields by an execution of a data quality function process, and output mapping for selecting and automatically mapping one or more output attributes that contain desired data results using the semantic annotations by the execution of the data quality function process, the semantic annotations including one or more type annotations for executing the input mapping and the output mapping, the one or more type annotations defining a named instance for an attribute of the data and including a match annotation that is applied to output attributes that contain match data for detecting duplicates and distinguishing between attributes of the data, wherein execution of the data quality function process, based on the one or more type annotations, groups the one or more output attributes having different data model schema than data model schema of corresponding input attributes, in accordance with a type annotation of the one or more input attributes, and the data quality annotations are attributes that define locale-specific data quality rules to be applied to the data at each of the plurality of discrete levels of granularity, wherein one or more data quality annotations is configured to be applied to one or more semantic annotations to define one or more composite attributes, wherein the data quality annotations include a masking attribute defining a locale-specific data masking rule preventing access to data without authorization, the data quality annotations include one or more variation data quality annotations for executing selection of a variation of data in one or more data quality output fields, the one or more variation data quality annotations defining a plurality of selectable variations of an attribute of the data, wherein the one or more type annotations and the one or more variation data quality annotations are used to generate one or more matching standards defining one or more alternatives of matching data to data quality output fields;

automatically mapping the semantic annotations to the data quality input fields and to data quality output fields in accordance with the hierarchical arrangement of the semantic annotations and locale-specific data quality rules;

applying the data quality rules to the data using the data quality annotations to perform a data quality function having one or more composite attributes;

performing the data quality function on the data; and outputting, using the one or more generated matching standards, the data to a destination in a format defined by the data quality output fields, wherein at least a portion of data is masked in accordance with the data masking rule.

10. The system of claim 9 wherein the semantic annotations include a combination of multiple semantic annotations that define a custom output format for the data.

11. The system of claim 9 wherein the data quality annotation is applied to an output attribute of the data.

12. The system of claim 9 wherein the data quality annotation is applied to an input attribute of the data.

13. The system of claim 9 wherein the data quality function includes a data quality cleanse process.

14. The system of claim 9 wherein the data quality function includes a data quality matching process.

15. A computer program product for performing a data quality function, the computer program product being tangibly embodied on a non-transitory computer-readable storage medium and comprising instructions that, when executed, are configured to cause at least one computing device to:

receive, by an execution of a data quality function process, at least one record from a source, wherein the record includes data, semantic annotations and data quality annotations associated with the data in the record, wherein the semantic annotations are attributes arranged hierarchically in accordance with a plurality of discrete levels of granularity and defining a type of data contained in each attribute, an input mapping for automatically mapping one or more of the semantic annotations to one or more data quality input fields by the execution of the data quality function process, and output mapping for selecting and automatically mapping one or more output attributes that contain desired data results using the semantic annotations by the execution of the data quality function process, the semantic annotations including one or more type annotations for executing the input mapping and the output mapping, the one or more type annotations defining a named instance for an attribute of the data and including a match annotation that is applied to output attributes that contain match data for detecting duplicates and distinguishing between attributes of the data, wherein execution of the data quality function process, based on the one or more type annotations, groups the one or more output attributes having different data model schema than data model schema of corresponding input attributes, in accordance with a type annotation of the one or more input attributes, and the data quality annotations are attributes that define locale-specific data quality rules to be applied to the data at each of the plurality of discrete levels of granularity, wherein one or more data quality annotations is configured to be applied to one or more semantic annotations to define one or more composite attributes, wherein the data quality annotations include a masking attribute defining a locale-specific data masking rule preventing access to data without authorization, the data quality annotations include one or more variation data quality annotations for executing selection of a variation of data in one or more data quality output fields, the one or more variation data quality annotations defining a plurality of selectable variations of an attribute of the data, wherein the one or more type annotations and the one or more variation data quality annotations are used to generate one or more matching standards defining one or more alternatives of matching data to data quality output fields;

automatically map, by the execution of the data quality function process, the semantic annotations to the data quality input fields and to data quality output fields in accordance with the hierarchical arrangement of the semantic annotations and locale-specific data quality rules;

apply, by the execution of the data quality function process, the data quality rules to the data using the data quality annotations to perform a data quality function having one or more composite attributes;

perform, by the execution of the data quality function process, the data quality function on the data; and output, by the execution of the data quality function process, using the one or more generated matching standards, the data to a destination in a format defined by the data quality output fields, wherein at least a portion of data is masked in accordance with the data masking rule.

16. The computer program product of claim 15 wherein the semantic annotations include a combination of multiple semantic annotations that define a custom output format for the data.

* * * * *